(12) United States Patent
Sakai et al.

(10) Patent No.: US 9,012,924 B2
(45) Date of Patent: Apr. 21, 2015

(54) SPECTRUM DETECTOR INCLUDING A PHOTODECTOR HAVING A CONCAVO-CONVEX PATTEN

(75) Inventors: Shiro Sakai, Tokushima (JP); Won Chul Seo, Ansan-si (KR); Dae Won Kim, Ansan-si (KR)

(73) Assignees: Seoul Viosys Co., Ltd., Ansan-si (KR); Shiro Sakai, Tokushima-Shi (JP)

( * ) Notice: Subject to any disclaimer, the term of this patent is extended or adjusted under 35 U.S.C. 154(b) by 473 days.

(21) Appl. No.: 13/321,082

(22) PCT Filed: Aug. 17, 2009

(86) PCT No.: PCT/KR2009/004584
§ 371 (c)(1),
(2), (4) Date: Nov. 17, 2011

(87) PCT Pub. No.: WO2011/002129
PCT Pub. Date: Jan. 6, 2011

(65) Prior Publication Data
US 2012/0057156 A1    Mar. 8, 2012

(30) Foreign Application Priority Data

Jun. 30, 2009 (JP) ................................ 2009-154680

(51) Int. Cl.
H01L 29/26 (2006.01)
G01J 3/36 (2006.01)
(Continued)

(52) U.S. Cl.
CPC . *G01J 3/36* (2013.01); *B82Y 20/00* (2013.01); *G01J 3/02* (2013.01); *G01J 3/0205* (2013.01); *G01J 3/0259* (2013.01); *G01J 2003/1213* (2013.01)

(58) Field of Classification Search
USPC .......... 257/E33.076, 79, 98, E33.003, 13, 21; 438/47
See application file for complete search history.

(56) References Cited

U.S. PATENT DOCUMENTS 6,392,217 B1    5/2002 Teranuma et al.
6,597,482 B1 *  7/2003 Chung et al. .................... 398/87
(Continued)

FOREIGN PATENT DOCUMENTS

JP    11-103077      4/1999
JP    2000-156487    6/2000
(Continued)

OTHER PUBLICATIONS

Machine translation of JP-11-103077.*
(Continued)

*Primary Examiner* — Kimberly Rizkallah
*Assistant Examiner* — Alexander Belousov
(74) *Attorney, Agent, or Firm* — H. C. Park & Associates, PLC

(57) ABSTRACT

Provided is a spectrum detector capable of being miniaturized and which does not require complicated optical axis alignment. The spectrum detector of the present invention comprises: a substrate; a photodetector formed on the substrate and including a semiconductor having a plurality of convex portions; and a wavelength detection circuit for detecting a wavelength of light transmitted through the plurality of convex portions, from light incident on the photodetector. According to the present invention, a small-sized spectrum detector can be provided which can easily detect a peak wavelength distribution included in light of an unknown wavelength, without the use of optical equipment such as a grating or prism, thus dispensing with the need for the optical axis alignment of a complex optical system.

5 Claims, 16 Drawing Sheets

(51) Int. Cl.
*B82Y 20/00* (2011.01)
*G01J 3/02* (2006.01)
*G01J 3/12* (2006.01)

(56) References Cited

U.S. PATENT DOCUMENTS

2004/0195598 A1* 10/2004 Tysoe et al. .................. 257/233
2008/0080579 A1* 4/2008 Scherer ..................... 372/45.011
2008/0117941 A1* 5/2008 Nagatomo ........................ 372/19
2008/0179700 A1* 7/2008 Miyachi et al. ............... 257/458
2009/0033923 A1 2/2009 Lyu et al.

FOREIGN PATENT DOCUMENTS

KR 10-2000-0056928 9/2000
KR 10-0833254 5/2008

OTHER PUBLICATIONS

International Search Report of PCT/KR2009/004584 mailed on Jul. 30, 2010.

* cited by examiner (A)          (B)

(A)

(B)

(C)

(A)

(B)

(C)

SPECTRUM DETECTOR INCLUDING A PHOTODECTOR HAVING A CONCAVO-CONVEX PATTEN

CROSS REFERENCE TO RELATED APPLICATIONS

This application is the national stage of International Application No. PCT/KR2009/004584, filed on Aug. 17, 2009, and claims priority from and the benefit of Japanese Patent Application No. 2009-154680, filed on Jun. 30, 2009, all of which are incorporated herein by reference for all purposes as if fully set forth herein.

BACKGROUND OF THE INVENTION

1. Field of the Invention

The present invention relates to a spectrum detector, and more particularly, to a spectrum detector including a plurality of photodetectors, each of which has a concavo-convex pattern formed on a semiconductor device.

2. Discussion of the Background

In general, a diffraction grating is frequently used to implement a spectroscopic analysis of light with respect to wavelengths for the purpose of measuring the spectra of light exiting a light source. The diffraction grating is formed to have 1200 to 1600 gratings (slits) per millimeter. If the diffraction grating is rotated about an axis of the diffraction grating, light of a specific wavelength is incident on one slit. Both ends of the grating are machined so that their angles are not constant.

Recently, a small-sized wavelength spectrometer using such a diffraction grating and a charge-coupled device (CCD) has been produced. This wavelength spectrometer requires a considerable distance between the diffraction grating and the CCD. A visible wavelength spectrometer generally has a size of 5 cm×10 cm×3 cm or so.

SUMMARY OF THE INVENTION

An object of the present invention is to provide a spectrum detector that can be miniaturized and do not require a complicated alignment of an optical axis.

According to an aspect of the present invention, there is provided a spectrum detector comprising: a substrate; a photodetector formed on the substrate and including a semiconductor having a plurality of convex portions; and a wavelength detection circuit for detecting a wavelength of light transmitted through the plurality of convex portions, from light incident on the photodetector.

In addition, the photodetector may be provided with a plurality of the photodetectors, the convex portions of the plurality of photodetectors may be different from one another in at least one of size, pitch and height, and the wavelength detection circuit may detect a wavelength of light transmitted through the plurality of convex portions of each of the photodetectors in light incident on the plurality of photodetectors.

Further, the plurality of photodetectors respectively may output optical voltages when light is incident thereon, and the wavelength detection circuit may comprise an optical voltage measurement circuit for measuring the optical voltages respectively outputted from the plurality of photodetectors and outputting an optical voltage measurement signal; a memory for recording a plurality of reference optical voltage measurement results and a plurality of reference potential difference results corresponding to the plurality of photodetectors; a waveform extraction circuit for extracting a waveform of a comparison object from the optical voltage measurement signal outputted from the optical voltage measurement circuit with reference to the reference optical voltage measurement signal recorded in the memory; a potential difference calculation circuit for calculating a potential difference of the waveform extracted by the waveform extraction circuit and outputting a measurement potential difference; and a comparison circuit for comparing the measurement potential difference outputted from the potential difference calculation circuit with the plurality of reference potential difference results recorded in the memory and detecting a peak wavelength included in the incident light.

Furthermore, the optical voltage measurement circuit may measure an optical voltage outputted from each of the photodetectors when reference light including a known peak wavelength is incident on the plurality of photodetectors and output a reference optical voltage measurement signal, and the wavelength detection circuit may have a control circuit for recording the plurality of reference optical voltage measurement signals outputted from the optical voltage measurement circuit as the reference optical voltage measurement results in the memory.

In addition, the potential difference calculation circuit may calculate voltage differences of the plurality of reference optical voltage measurement results recorded in the memory and output them as the reference potential difference results, and the control circuit may record the plurality of reference potential difference results outputted from the potential difference calculation circuit in the memory.

In addition, the plurality of photodetectors, the wavelength detection circuit, and a driving circuit may be mounted on the same circuit board in common.

According to the present invention, a small-sized spectrum detector can be provided which can easily detect a peak wavelength distribution included in light of an unknown wavelength without using an optical component such as a diffraction grating or prism, thereby dispensing with the need for the optical axis alignment of a complex optical system.

DETAILED DESCRIPTION OF THE ILLUSTRATED EMBODIMENTS

Hereinafter, embodiments of the present invention will be described in detail with reference to the accompanying drawings. In addition, each of the embodiments described below is merely one form of the present invention, and the present invention is not limited to these embodiments.

Figure 1:
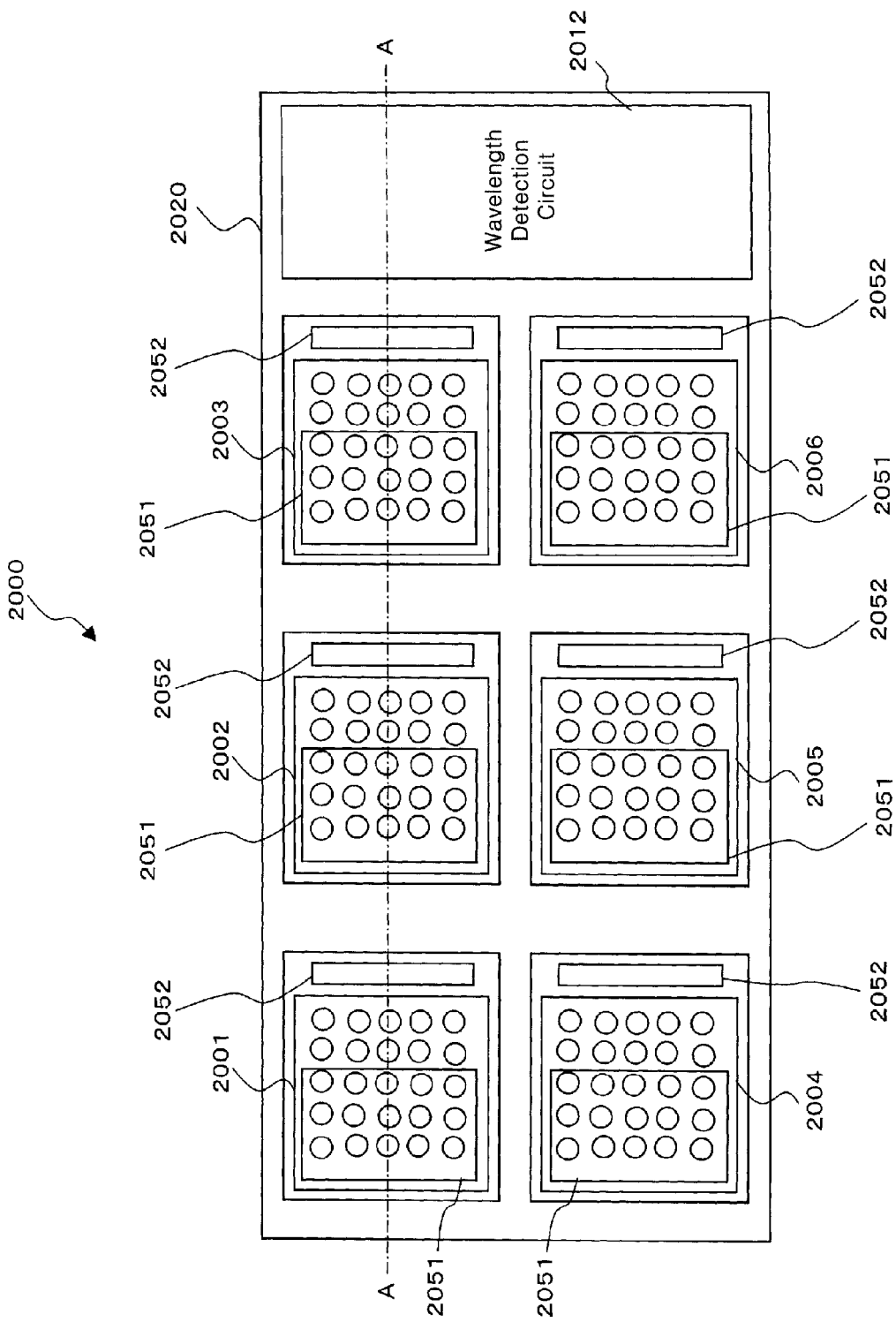
FIG. 1 is a plan view showing the schematic configuration of a spectrum detector 2000 according to an embodiment of the present invention.

In one embodiment, a spectrum detector including a plurality of photodetectors according to the present invention will be described. FIG. 1 shows the schematic configuration of a spectrum detector 2000 according to an embodiment of the present invention. The spectrum detector 2000 according to the embodiment of the present invention includes photodetectors 2001 to 2006 having the same configuration on a substrate 2020. In this embodiment, the spectrum detector having the six photodetectors will be described as an example. However, the number of photodetectors is not limited thereto, and a larger number of photodetectors are provided, thereby implementing a high-precision spectrum detector. In this embodiment, the term "reference light," which will be described later refers to light of which the wavelength λ is previously known, and the term "light to be measured" refers to light of which the wavelength λ is not yet known.

Figure 2:
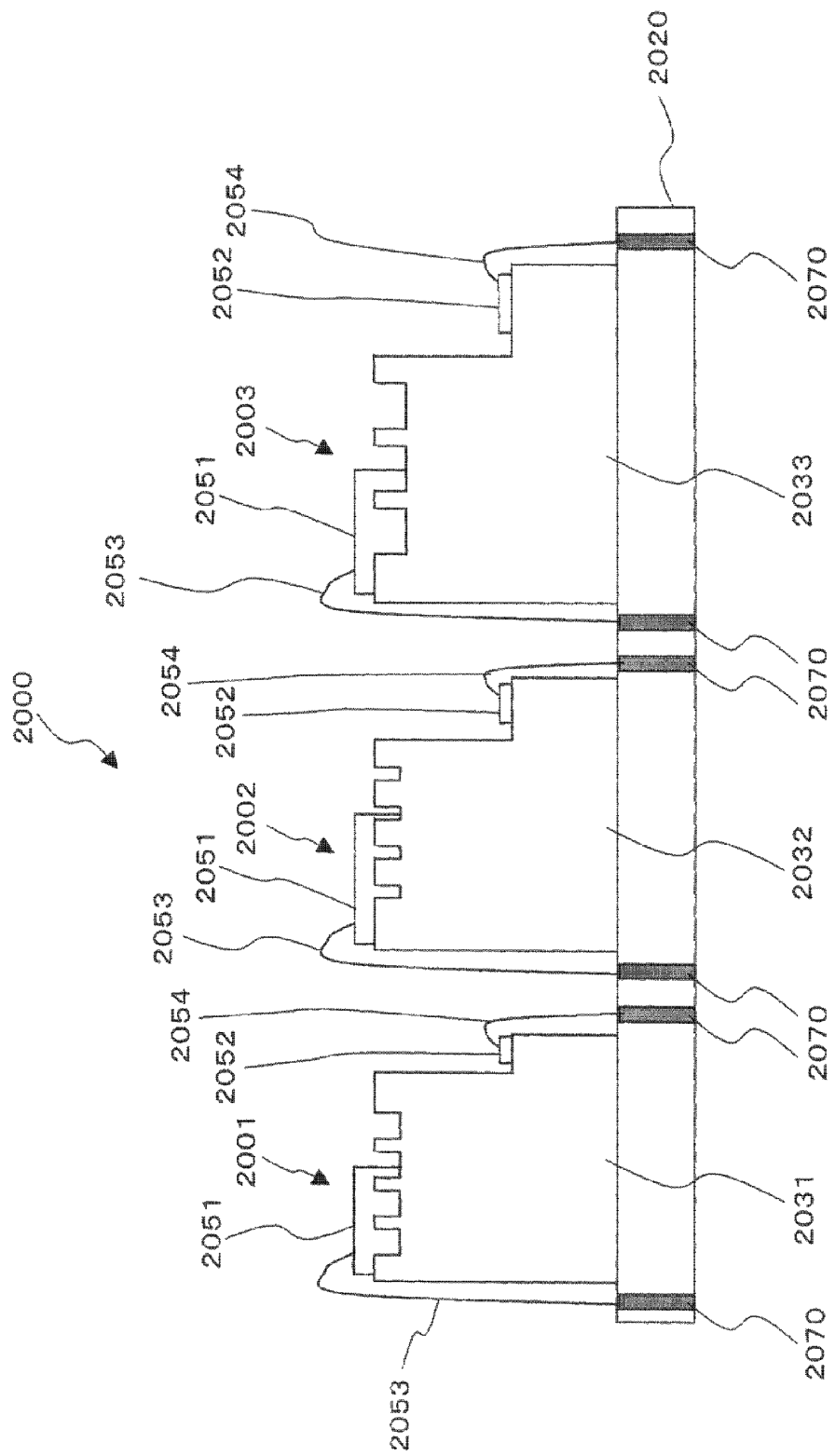
FIG. 2 is a sectional view taken along line A-A of the spectrum detector 2000 in FIG. 1.

In FIG. 1, the spectrum detector 2000 has the photodetectors 2001 to 2006 and a wavelength detection circuit 2012 mounted on the print substrate 2020. As shown in FIG. 2 which is a sectional view taken along line A-A of FIG. 1, each of the photodetectors 2001 to 2003 is formed as a photodetection layer having a GaN layer formed in its upper layer. Although the cross sectional structure of the photodetectors 2001 to 2003 are shown in FIG. 2, the photodetectors 2004 to 2006 which are not shown in this figure have the same structure.

Figure 3:
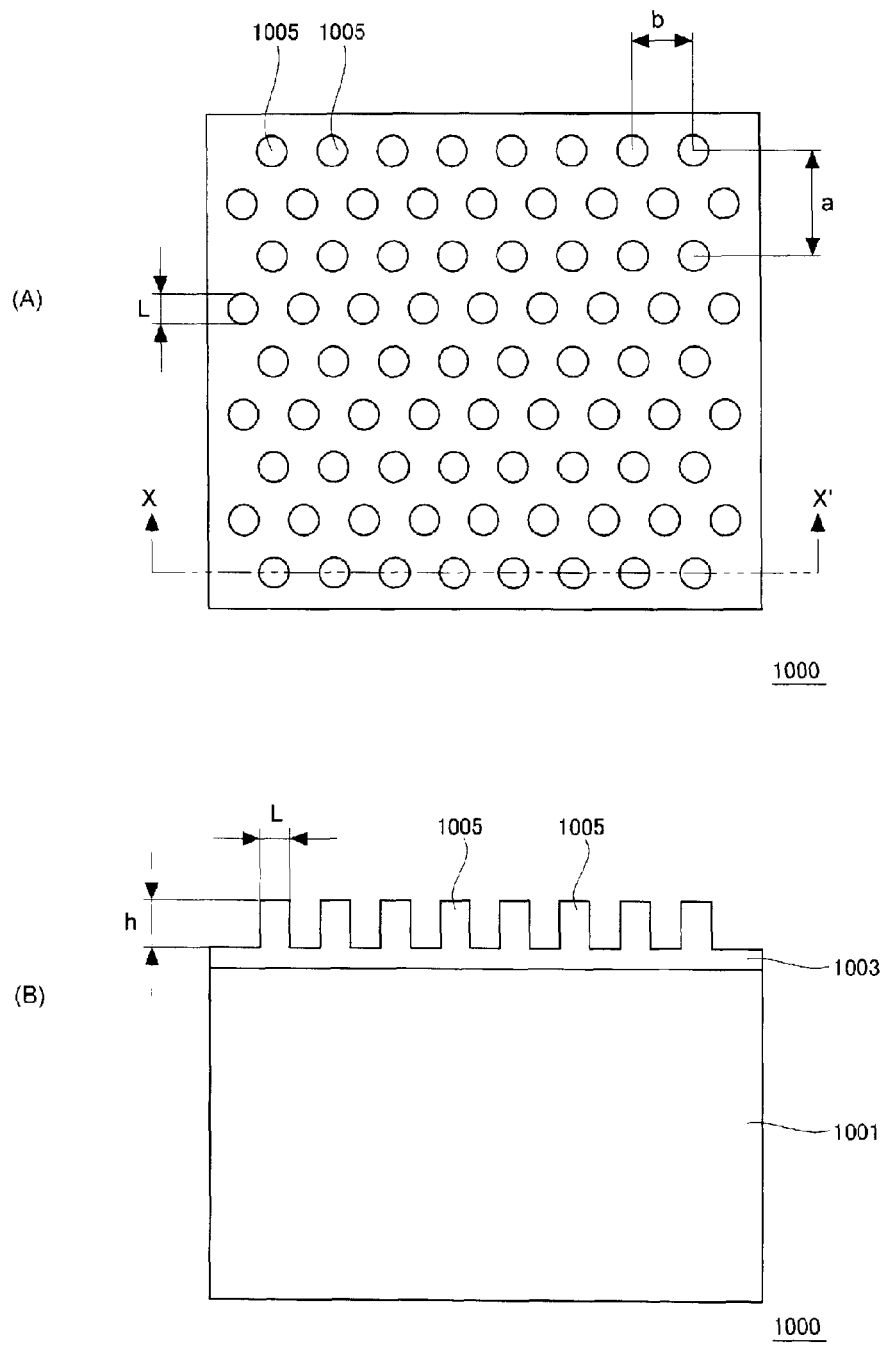
FIG. 3 shows schematic configuration views of a photodetector 1000 according to an embodiment of the present invention, wherein FIG. 3 (A) is a plan view of the photodetector 1000 while FIG. 3 (B) is a sectional view taken along line X-X' of FIG. 3 (A)

Next, a photodetector will be described. FIG. 3 shows schematic configuration views of a photodetector 1000 according to an embodiment of the present invention, wherein FIGS. 3 (A) and (B) are a plan view of the photodetector and a sectional view taken along line X-X' of the photodetector, respectively. The photodetector 1000 has a substrate portion 1001 and a semiconductor layer 1003. As shown in FIGS. 3 (A) and (B), the semiconductor layer 1003 of the photodetector 1000 has a plurality of convex portions 1005. The convex portions 1005 are arranged according to a predetermined rule. A concavo-convex pattern formed by the convex portions 1005 is referred to as "a nano-pattern." In this embodiment, each of the convex portions 1005 has a shape of a cylinder with a diameter 'L' and a height 'h,' and the convex portions 1005 are arranged to have a short pitch (short period) 'b' and a long pitch (long period) 'a,' as shown in FIG. 3 (A). Further, a cylindrical convex portion is used as the convex portion 1005 in this embodiment, but the present invention is not limited thereto. For example, the convex portion may be variously shaped as a polyprism, a cone, a triangular pyramid, and the like. Nevertheless, it is preferable that the difference between concave and convex portions in the concavo-convex pattern is adjusted so as not to be increased so much when the shape of each convex portion 1005 is selected. Further, each of the convex portions 1005 is disposed to be positioned at apex of a regular triangle in this embodiment, but the present invention is not limited thereto.

In this embodiment, each convex portion 1005 has a diameter L=150 nm and a height h=70 nm and the convex portions 1005 are arranged to have a short pitch b=300 nm and a long pitch a=√3×b=√3×300 nm≈520 nm, but the present invention is not limited thereto.

Figure 4:
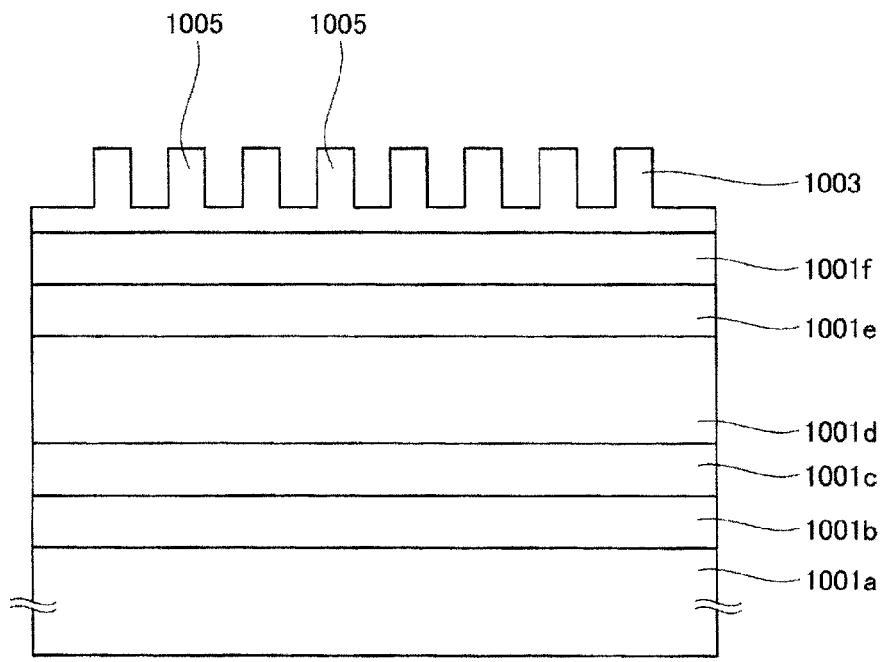
FIG. 4 is a view showing the configuration of a substrate portion 1001 of the photodetector 1000 according to the embodiment of the present invention.

FIG. 4 shows the detailed configuration of a substrate portion 1001 of the photodetector 1000 according to this embodiment. In this embodiment, the substrate portion 1001 has the same structure as a light emitting diode (LED) using a GaN-based compound semiconductor. Specifically, in this embodiment, the substrate portion 1001 is formed by sequentially stacking a GaN buffer layer 1001b (25 nm), a u-GaN layer 1001c (500 nm), an n-GaN clad layer 1001d (2 μm), an $In_{0.05}Ga_{0.95}N$ quantum well active layer 1001e (2 nm) and a p-$Al_{0.20}Ga_{0.80}N$ layer 1001f (30 nm) on a sapphire substrate 1001a. In this embodiment, a p-GaN layer 1003 (110 nm) is formed on the p-$Al_{0.20}Ga_{0.80}N$ layer 1001f of the substrate portion 1001. Further, the substrate portion 1001 has the structure as described above in this embodiment, but the present invention is not limited thereto.

In addition, the p-type gallium nitride layer (p-GaN layer) 1003 (110 nm) is formed on the substrate portion 1001 in this embodiment, but the present invention is not limited thereto. For example, a GaN-based semiconductor such as n-GaN or $Al_xGa_{1-x}N$ may be used. If n-GaN is used as the semiconductor layer 1003, a schottky barrier may be used. If n-GaN or n-InGaAlN (only, a carrier concentration of the n-type material <5×10$^{17}$ cm$^3$) is used, light can be sensed not only in a p-n junction portion but also in an n-type semiconductor layer. Photovoltaic photodetectors are classified into a p-n junction photodetector and an n-type schottky photodetector. In the n-type schottky photodetector, the n-type material requires a low carrier concentration (a carrier concentration of the n-type material <5×10$^{17}$ cm$^3$ or I-layer). The I-layer refers to a layer in which there is no carrier, and an undoped layer is referred to as the I-layer in many cases. Specifically, a layer in which carriers are removed by dislocations such as in a GaN layer, and a layer in which carriers are removed using a p-type dopant may be also referred to as the I-layer. Similarly, a layer in which carriers are removed by introducing an n-type dopant to a p-type semiconductor may be also referred to as the I-layer.

A fabricating method of the convex portions 1005 of the p-GaN layer 1003 will be described later. By etching a portion of the p-$Al_{0.20}Ga_{0.80}N$ layer 1001f, the convex portions 1005 may be formed by the portion of the p-$Al_{0.20}Ga_{0.80}N$ layer 1001f and the p-GaN layer 1003.

Figure 5:
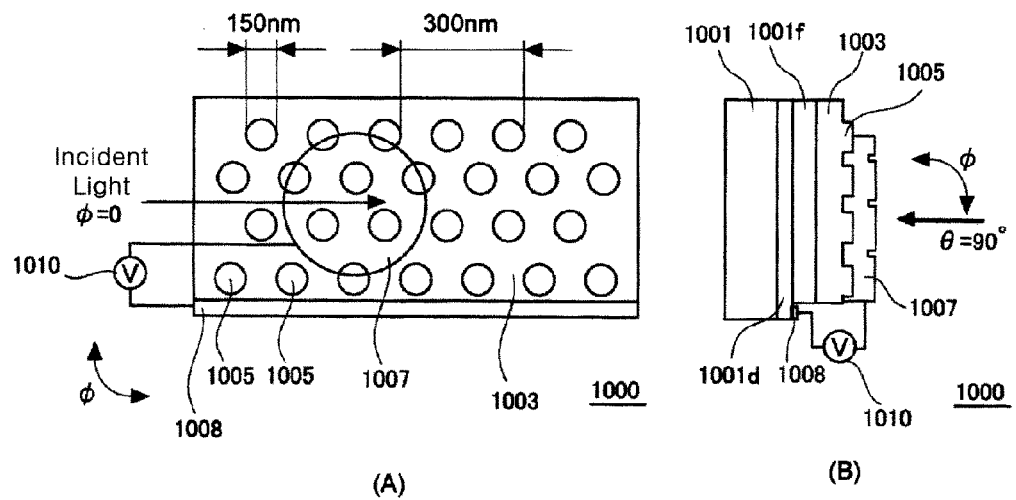
FIGS. 5 (A) and (B) are views illustrating a state that light is incident on the photodetector 1000 according to the embodiment of the present invention.

Next, an operation of the photodetector 1000 according to the embodiment of the present invention will be described with reference to FIGS. 5 to 9. FIGS. 5 (A) and (B) are views illustrating a state that light is incident on the photodetector 1000 according to the embodiment of the present invention. In this embodiment, an incident angle of the light with respect to a short-pitch direction of the convex portions 1005 of the p-GaN layer 1003 is defined as $\Phi$, while an incident angle of the light with respect to a surface of the p-GaN layer 1003 is defined as $\theta$. The incident angle which is parallel to the short-pitch direction is defined as $\Phi=0$, and the incident angle which is normal to the surface of the p-GaN layer 1003 is defined as $\theta=90°$. In the photodetector 1000 according to this embodiment of the present invention, the light from a light source is incident on sides and surfaces of the convex portions 1005.

To identify the operation of the photodetector 1000 according to this embodiment, a p-electrode was formed by forming a Ni and Au layer 1007 on the GaN-based semiconductor layer (p-GaN layer) 1003 (see FIGS. 5 (A) and (B)). An n-electrode was formed by etching a portion of the photodetector until the n-GaN layer 1001d was exposed and then forming a Ti and Al layer 1008 on the etched portion. The potential difference (optical voltage) between a p-electrode and an n-electrode is measured by a voltmeter 1010. In addition, the other layers except the n-GaN layer 1001d and the p-$Al_{0.20}Ga_{0.80}N$ layer 1001f in the substrate 1001 are omitted in FIG. 5 (B) for convenience of illustration.

When light ($\lambda$ ranging from 200 nm to 500 nm) from a xenon lamp is incident on the photodetector 1000 according to this embodiment, the incident angle $\theta$ is changed ranging from 19° to 39° with a step of 1°, and the incident angle $\Phi$ is changed ranging from 0° to 360°, the potential difference between the p-electrode and the n-electrode was measured by the voltmeter 1010.

Figure 6:
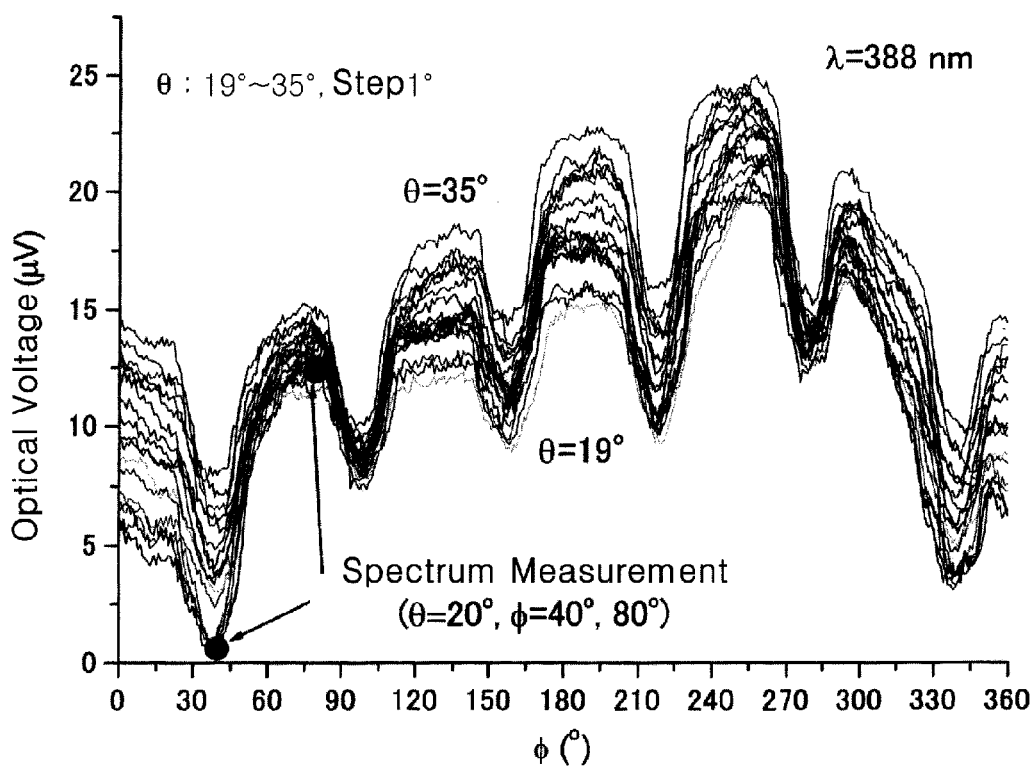
FIG. 6 is a graph showing a result obtained by measuring a potential difference is between a p-electrode and an n-electrode using a voltmeter 1010 when light (λ ranging from 200 nm to 500 nm) from a xenon lamp is incident on the photodetector 1000, an incident angle θ is changed ranging from 19° to 39° with a step of 1°, and another incident angle Φ is changed ranging from 0° to 360° according to the embodiment of the present invention.

The measured result is shown in FIG. 6. FIG. 6 shows the measured result of the potential difference (optical voltage) between the p-electrode and the n-electrode of the photodetector 1000 when $\lambda=388$ nm. As shown in FIG. 6, it can be seen that whenever the incident angle $\theta$ is changed from 19° to 39°, the optical voltage is changed to have a plurality of minimum and maximum values with respect to the change in the incident angle $\Phi$.

Figure 7:
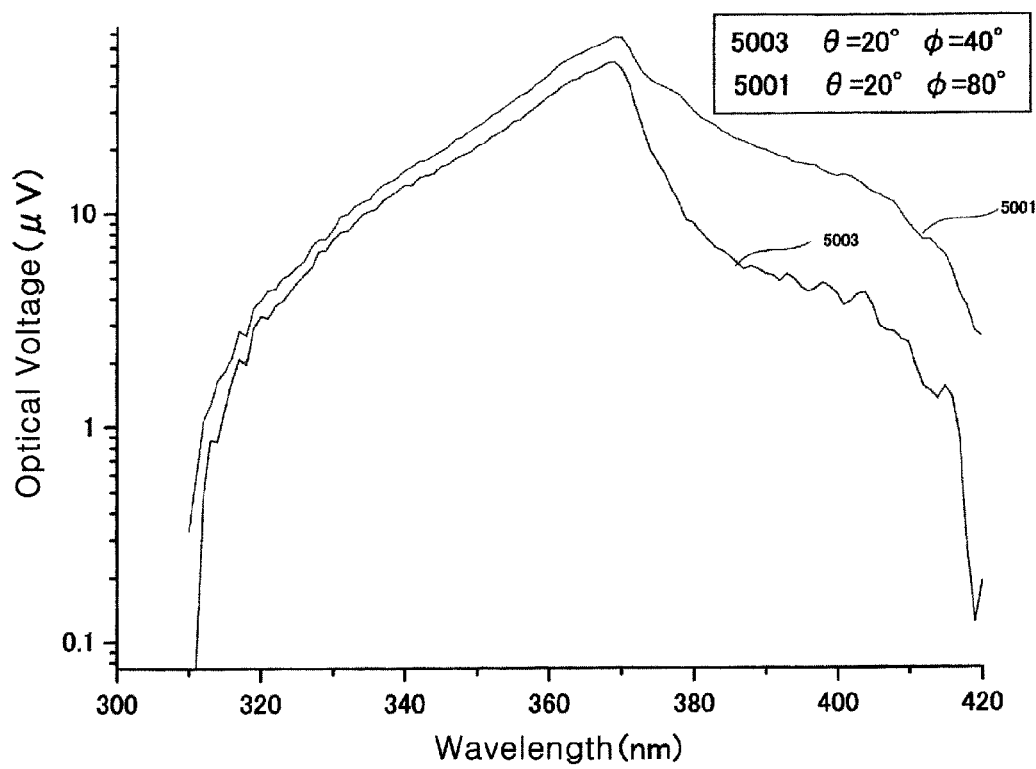
FIG. 7 is a graph showing a result obtained by calculating a difference (voltage difference) between a wavelength distribution 5001 of an optical voltage at an incident angle of Φ=80° and a wavelength distribution of an optical voltage at an incident angle of Φ=40° with respect to the photodetector 1000 according to the embodiment of the present invention.
Figure 8:
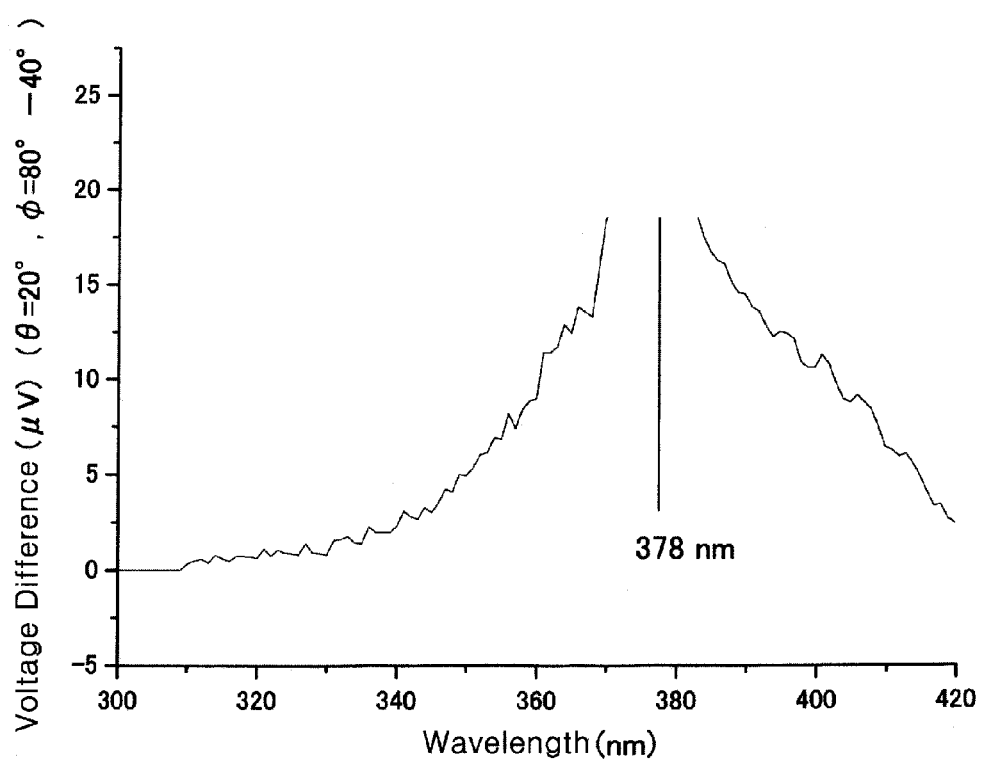
FIG. 8 is a graph showing a result for the wavelength distribution of optical voltage obtained by spectrum-analyzing data related with minimum and maximum values of the optical voltage when an incident angle of Φ=20° with respect to the photodetector 1000 according to the embodiment of the present invention.

FIG. 7 shows a result for the wavelength distribution of optical voltages obtained by spectrum-analyzing data of the minimum and maximum values (points designated by • in FIG. 6, the incident angle $\Phi=40°$ and 80°) of the optical voltages when the incident angle $\theta$ is 20°. FIG. 8 shows a result obtained by calculating the difference (voltage difference) between the wavelength distribution 5001 of optical voltages at an incident angle of $\Phi=80°$ and the wavelength distribution 5003 of optical voltages at an incident angle of $\Phi=40°$. As shown in FIG. 8, the voltage difference is maximum when the wavelength $\lambda=378$ nm. Thus, it can be seen that the photodetector 1000 according to this embodiment most poorly absorbs the incident light with a wavelength $\lambda=378$ nm, i.e., most well transmits the incident light. In other words, the photodetector 1000 according to this embodiment transmits incident light with a specific peak wavelength $\lambda=378$ nm among the whole light incident thereon. Therefore, if light is incident on the photodetector 1000 according to this embodiment and transmitted light is detected by application of the aforementioned principle, it can be visually identified whether or not the incident light has a specific peak wavelength $\lambda=378$ nm. Thus, it is possible to detect light with a specific peak wavelength without using an optical component such as a diffraction grating or prism, so that a small-sized photodetector that does not require a complicated alignment of the optical axis in an optical system can be implemented.

In the photodetector 1000 according to this embodiment, since each of the convex portions 1005 has a diameter L=150 nm and a height h=70 nm and they are arranged to have a short pitch b=300 nm and a long pitch a ≈520 nm, it is considered that the light with a specific peak wavelength $\lambda=378$ nm is transmitted. In the photodetector 1000 according to this embodiment, the diameter 'L', the short pitch 'b', the long pitch 'a' and the height 'h' of the convex portions 1005 are correlated with a specific peak wavelength $\lambda$ of the transmitted light. That is, the light with a peak wavelength of $\lambda=378$ k nm can be transmitted, by multiplying the diameter 'L' of each convex portion by k times.

Figure 9:
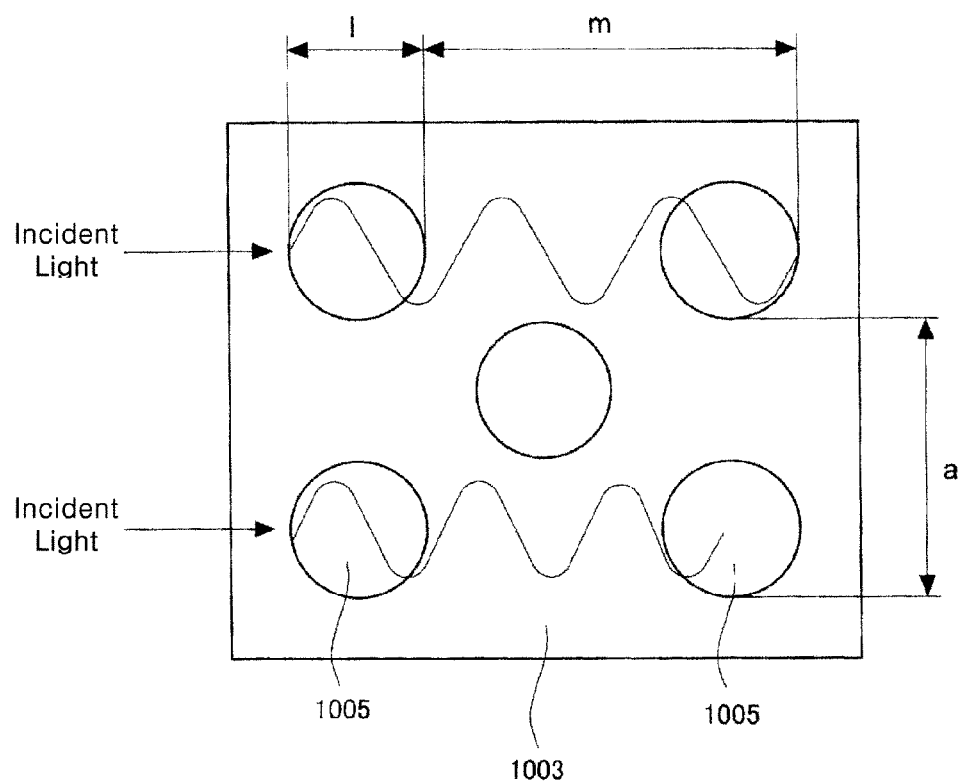
FIG. 9 is a plan view of the photodetector 1000 according to the embodiment of s the present invention.

Next, the photodetector according to this embodiment will be described with reference to FIG. 9. FIG. 9 is a plan view of the photodetector 1000 according to the embodiment of the present invention, in which a relationship between the diameter L and the pitch b of the convex portion 1005 and incident light is shown when the incident angle is $\theta$. In the photodetector 1000 according to this embodiment, the above relationship may be expressed by the following formula (1):

$$L \cdot m = \lambda \cdot \cos \theta / (2n) \quad (1)$$

where L denotes a diameter of each convex portion 1005, n denotes a refractive index (between the air and each convex portion 1005 (nano-pattern) of the GaN layer 1003), 1<n<2.6 (the refractive index of GaN), and m is an integer or a reciprocal of an integer. At this time, n is defined as a refractive index (between the air and the nano-pattern) because a nano-structure cannot be viewed with the naked eye (400 nm<visible wavelength (visible light)<700) nm, wherein a structure having a size ranging from 1 nm to 1 μm is generally referred to as a nano-structure).

Parameters of this embodiment, i.e., the diameter L=150 nm of the convex portion 1005, $\lambda=378$ and $\theta=20°$ may be inputted in the formula (1) to obtain the following formula (2):

$$n \cdot m = 1.187 \quad (2)$$

In the formula (2), n=1.187 when m=1, while n=2.37 when m=½. Thus, an appropriate numerical value can be obtained using the refractive index n between the air and the GaN nano-pattern.

In the photodetector 1000 according to this embodiment, incident light is guided onto the convex portions 1005 so that a specific wavelength component may be absorbed, thereby generating light with a specific peak wavelength.

Formation of Convex Portions 1005 (Nano-Patterns)

Next, a fabricating method of the photodetector 1000 according to this embodiment, particularly, a fabricating method of the convex portions 1005 will be described.

Figure 10:
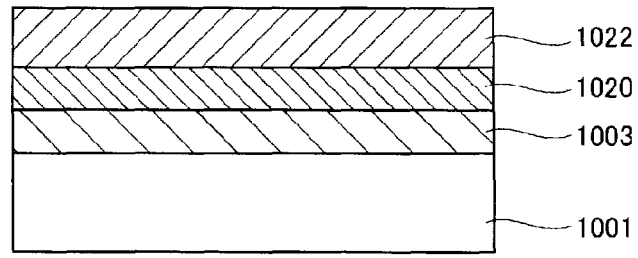
FIG. 10 shows sectional views illustrating a fabrication process of the photodetector 1000 according to the embodiment of the present invention.
Figure 10:
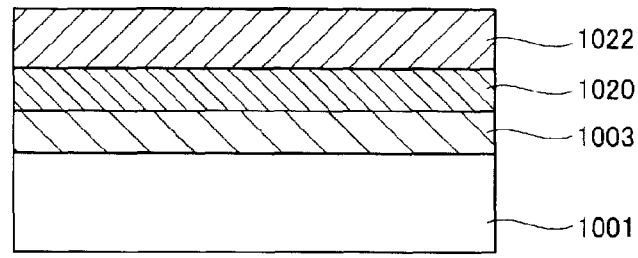
Figure 10:
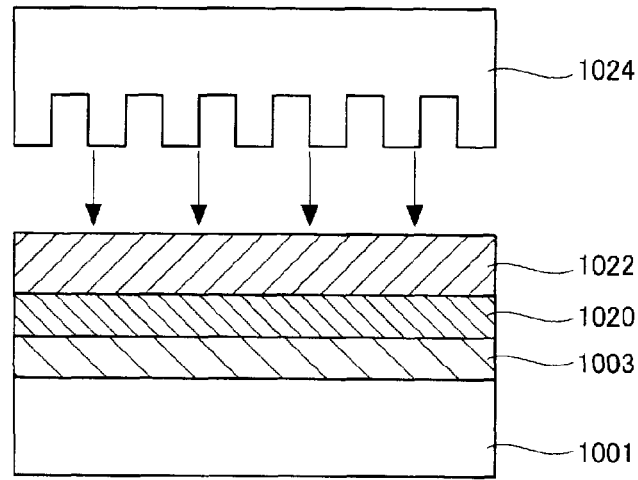

As shown in FIG. 10 (A), after a GaN layer 1003 is formed on a substrate portion 1001, a Ni layer 1020 with a thickness of 10 nm is deposited on the GaN layer 1003 using an electron beam (EB) deposition technique, and a thermosetting resin 1022 is applied on the Ni layer. Then, the thermosetting resin 1022 is softened by increasing the entire temperature (see FIG. 10 (B)). Subsequently, a nano-pattern is transferred to the thermosetting resin 1022 by pressing a mold 1024 with a desired pattern (nano-pattern) structure onto the thermosetting resin 1022 (see FIG. 10 (C)).

Figure 11:
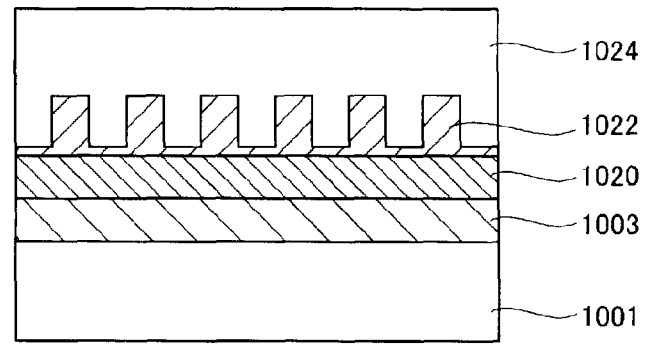
FIG. 11 shows sectional views illustrating a fabrication process of the photodetector 1000 according to the embodiment of the present invention.
Figure 11:
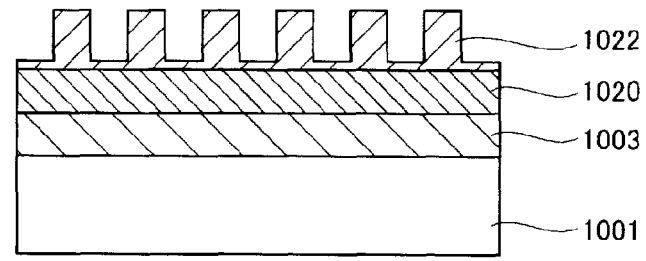
Figure 11:
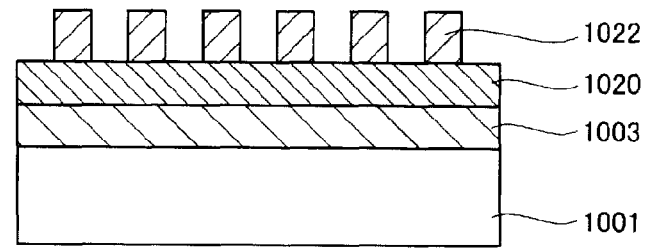

Subsequently, the thermosetting resin 1022 is cured by cooling the entire structure while the nano-pattern is transferred onto the thermosetting resin 1022 by the mold (see FIG. 11 (A)). Then, the mold 1024 is separated from the thermosetting resin 1022 (see FIG. 11 (B)). Subsequently, a residual film of the thermosetting resin 1022 is removed by performing the UV-$O_3$ treatment (see FIG. 11 (C)). At this time, the mold pattern of the thermosetting resin 1022 is slightly etched.

Figure 12:
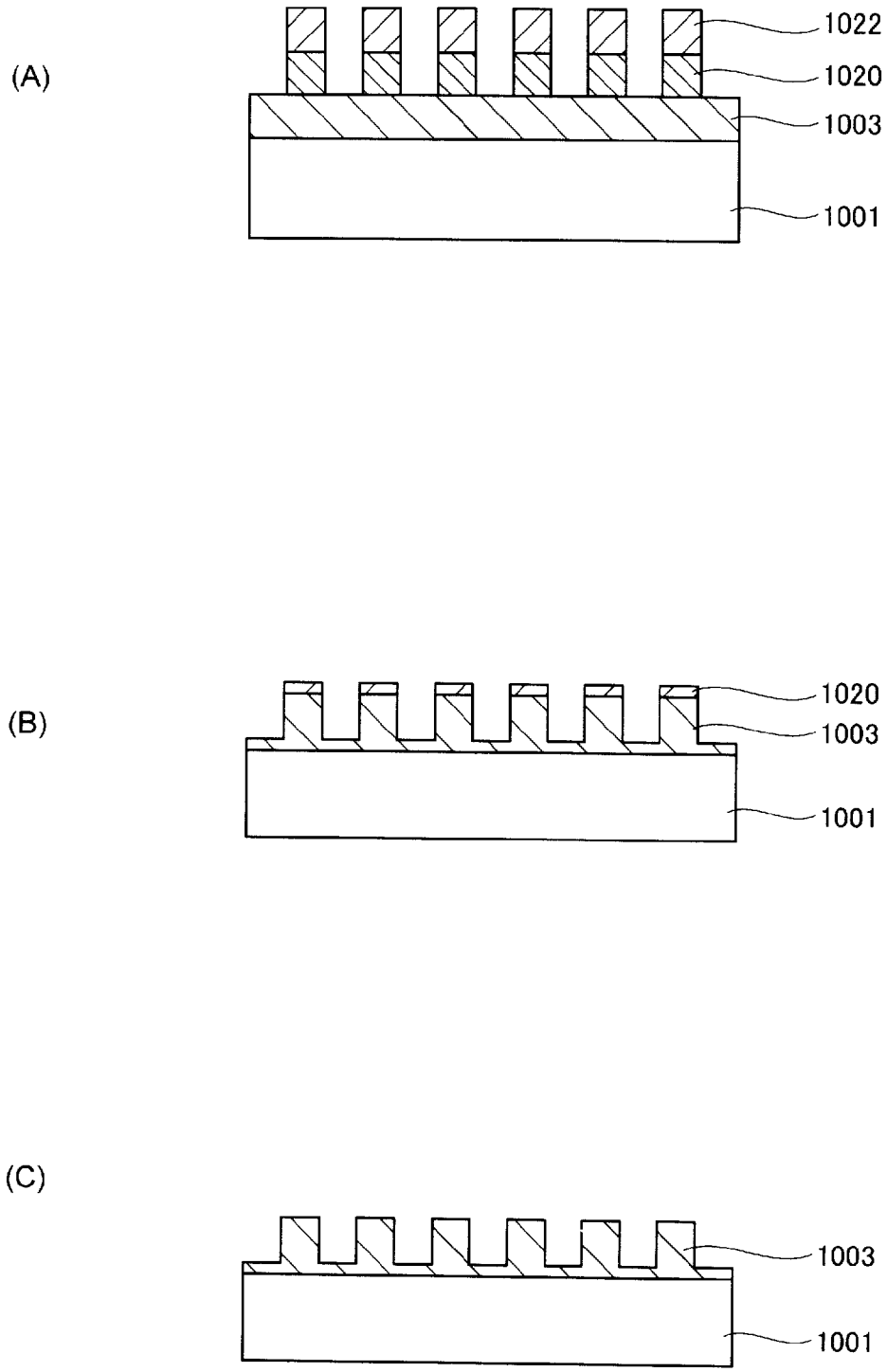
FIG. 12 shows sectional views illustrating a fabrication process of the photodetector 1000 according to the embodiment of the present invention.

Subsequently, the nano-pattern is formed in the Ni-layer 1020 by etching the Ni layer 1020 through reactive ion etching (RIE) using Ar gas (see FIG. 12 (A)). Then, the nano-pattern is formed in the GaN layer 1003 by etching the GaN layer 1003 through the RIE using $BCl_3$ and $Cl_2$ gas (see FIG. 12 (B)). Subsequently, the nano-pattern may be formed in the GaN layer 1003 by removing the Ni layer 1020 using a 5% $HNO_3$ solution (see FIG. 12 (C)). By etching a portion of p-$Al_{0.20}Ga_{0.80}N$ layer 1001$f$ in the substrate portion 1001 through an appropriate change in etching conditions, the convex portions 1005 may be formed by the p-GaN layer 1003 and the portion of the p-$Al_{0.20}Ga_{0.80}N$ layer 1001$f$.

Through the photodetector according to this embodiment, it is possible to detect light with a specific peak wavelength without using an optical component such as a diffraction grating or prism, so that a small-sized photodetector that does not require a complicated alignment of the optical axis in an optical system may be implemented.

The photodetectors 1000 formed as described above are mounted as photodetectors 2001 to 2006 on the substrate 2020 of the spectrum detector shown in FIG. 1. In the structure of the photodetectors 2001 to 2006, for example, the GaN buffer layer 1001$b$ (25 nm), the u-GaN layer 1001$c$ (500 nm), the n-GaN clad layer 1001$d$ (2 μm), $In_{0.05}Ga_{0.95}N$ quantum well active layer 1001$e$ (2 nm) and a p-$Al_{0.20}Ga_{0.80}N$ layer 1001$f$ (30 nm) are sequentially laminated on the sapphire substrate 1001$a$ as shown in FIG. 4. The structure of the photodetectors 2001 to 2006 is not limited thereto.

In addition, the respective convex portions of the photodetectors 2001 to 2006 have different shapes, that is, the diameter the short pitch 'b', the long pitch 'a' and the height 'h', shown in FIG. 3, are different from one another. That is, the respective convex portions of the photodetectors 2001 to 2006 are formed to have shapes so that the specific peak wavelengths λ of transmitted lights are different from one another.

Further, in FIGS. 1 and 2, reference numerals 2051 and 2052 designate electrodes for measuring a potential difference (optical voltage) generated when light is incident on the photodetectors 2001 to 2006. The electrode 2051 is a p-electrode formed from the Ni and Au layer 1007 on the GaN-based semiconductor layer (p-GaN layer) 1003, as shown in FIGS. 5 (A) and (B). The electrode 2052 is an n-electrode formed by etching the layers of the photodetector until the n-GaN layer 1001$d$ is exposed and then forming the Ti and Al layer 1008 on the etched portion, as shown in FIGS. 5 (A) and (B). In FIGS. 1 and 2, the electrode 2051 is formed to partially cover the top surfaces of the convex portions of each of the photodetectors 2001 to 2006. However, the present invention is not limited thereto, and the electrode may be formed to cover the whole surfaces of the convex portions.

In FIG. 2, the electrodes 2051 and 2052 of the respective photodetectors 2001 to 2003 are electrically connected to the substrate 2020 through bonding wires 2053 and 2054. Through-holes 270 passing through from the top surface to the bottom surface of the substrate are formed in the substrate 2020 at the connecting positions of such bonding wires 2053 and 2054. Wiring patterns (not shown) for electrically connecting the respective through-holes 2070 to the LED wavelength detection circuit 2012 are formed on the bottom surface of the substrate 2020. In addition, although not shown in FIG. 2, the respective electrodes 2051 and 2052 of the photodetectors 2004 to 2006 are electrically connected to the substrate 2020 by the bonding wires 2053 and 2054 in the same manner.

Through the configuration shown in FIG. 2, optical voltages respectively generated when light to be measured is incident on the photodetectors 2001 to 2006 are measured by the wavelength detection circuit 2012.

Figure 13:
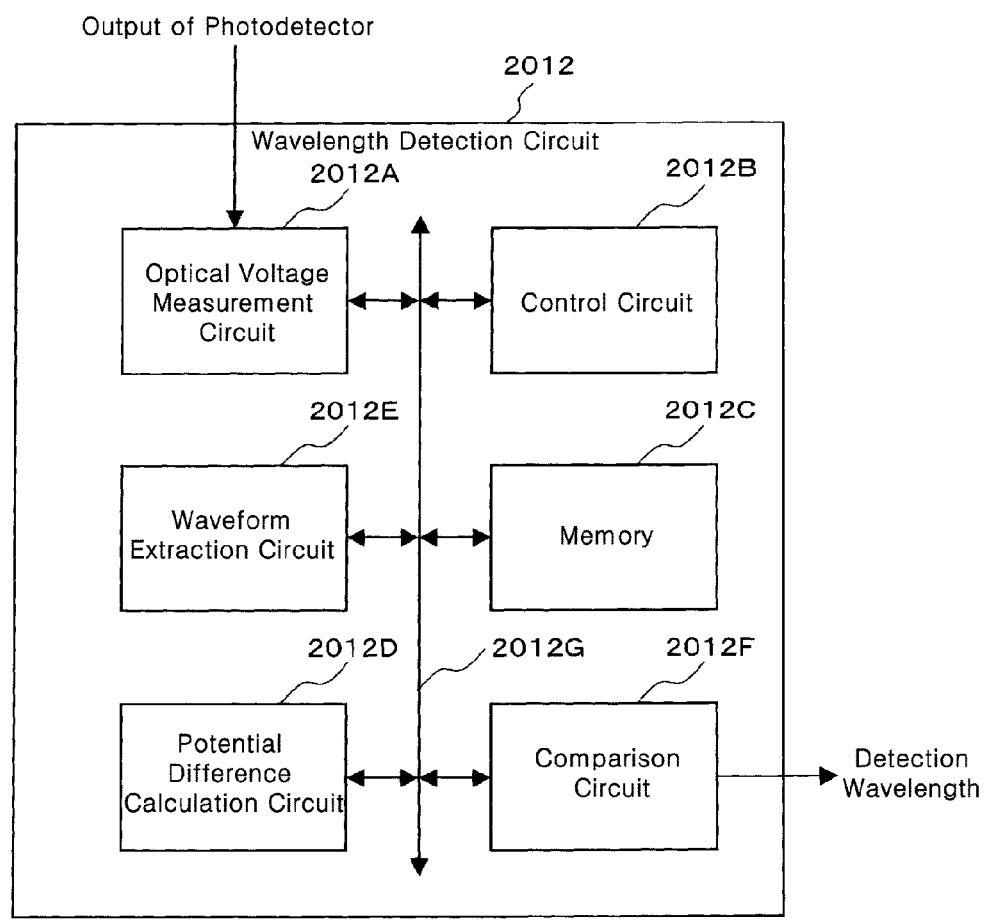
FIG. 13 is a circuit configuration view of a wavelength detection circuit 2012 of FIG. 1.

Next, the circuit configuration of the wavelength detection circuit 2012 is shown in FIG. 13. As shown in FIG. 13, the wavelength detection circuit 2012 includes an optical voltage detection circuit 2012A, a control circuit 2012B, a memory 2012C, a potential difference calculation circuit 2012D, a waveform extraction circuit 2012E and a comparison circuit 2012F. These circuits are electrically connected to one another by wiring patterns 2012G.

The optical voltage detection circuit 2012A is electrically connected to the bonding wires 2053 and 2054 formed in the photodetectors 2001 to 2006 shown in FIG. 1. The optical voltage detection circuit 2012A is a circuit for measuring voltage differences (optical voltages) respectively outputted from the photodetectors 2001 to 2006 when light is incident on the photodetectors.

The control circuit 2012B is a circuit for controlling operation in the wavelength detection circuit 2012, and controls a measurement/record processing of a reference optical voltage (see FIG. 14), a record processing of a reference potential difference result (see FIG. 15), and a wavelength detection processing (see FIGS. 16 and 17), which will be described later.

The memory 2012C records various types of control programs corresponding to the control the operation performed in the control circuit 2012B. In additional, the memory 2012C records a reference optical voltage measurement result in the measurement/record processing of the reference optical voltage (see FIG. 14), which will be described later, and records a reference potential difference result in the record processing of the reference potential difference result (see FIG. 15), which will be described later.

The potential difference calculation circuit 2012D calculates a reference potential difference result from the reference optical voltage measurement result in the record processing of the reference voltage difference result (see FIG. 15), which will be described later. In addition, the potential difference calculation circuit 2012D is a circuit for calculating a measurement potential difference result in a waveform extracted from light to be measured by the wavelength extraction circuit 2012E, in the wavelength detection processing (see FIGS. 16 and 17), which will be described later.

The waveform extraction circuit 2012E is a circuit for extracting a waveform to be a comparison object from light to be measured with reference to the reference optical voltage measurement result recorded in the memory 2012C, in the wavelength detection processing (see FIGS. 16 and 17), which will be described later.

The comparison circuit 2012F is a circuit for comparing the reference potential difference result recorded in the memory 2012C with the measurement potential difference result calculated by the potential difference calculation circuit 2012D and detecting a wavelength included in the light to be measured to thereby output the detected wavelength, in the wavelength detection processing (see FIGS. 16 and 17), which will be described later.

Next, the measurement/record processing of the reference optical voltage, which is performed in the wavelength detection circuit 2012, will be described with reference to FIG. 14. This processing is performed when reference light is incident on the spectrum detector 2000. In addition, the configuration and processing procedure related to this processing are shown in the wavelength detection circuit 2012 shown in FIG. 14.

In the photodetectors 2001 to 2006 shown in FIG. 1, peak wavelengths $\lambda$ transmitted to the photodetectors are 368 nm, 373 nm, 378 nm, 383 nm and 393 nm, respectively, and the interval is set to 5 nm. That is, as described above, the diameter 'L', short pitch 'b', long pitch 'a' and height 'h' of the convex portions of the photodetectors and the specific peak wavelength $\lambda$ of the transmitted light are related to one another, and the light with the specific peak wavelength is transmitted to the convex portion by increasing the diameter 'L' of the convex portion by k times. On the basis of this, the diameter 'L', short pitch 'b', long pitch 'a' and height 'h' of the convex portions of the photodetectors are formed so that lights with peak wavelengths $\lambda$ of 368 nm, 373 nm, 378 nm, 383 nm, 388 nm and 393 nm are transmitted to the convex portions. In addition, the setting of the peak wavelength $\lambda$ of light transmitted in the photodetectors 2001 to 2006 is not limited thereto, and may be appropriately modified corresponding to light to be measured. That is, the shape of the convex portions of the photodetectors 2001 to 2006 may be appropriately modified corresponding to light to be measured.

Figure 14:
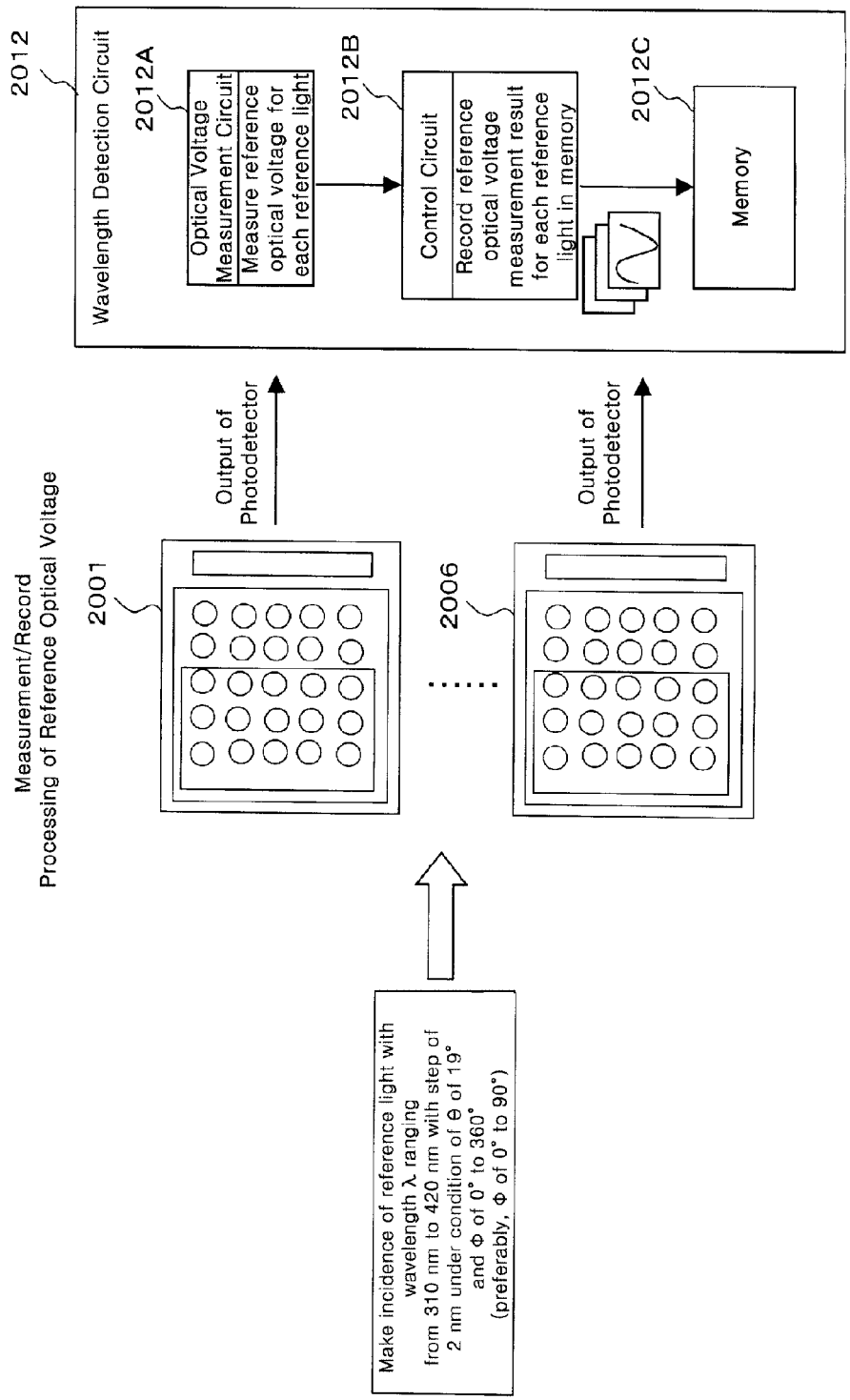
FIG. 14 is a view illustrating a measurement/record processing of a reference optical voltage, which is performed in the wavelength detection circuit 2012 of FIG. 13.

In the processing shown in FIG. 14, it is assumed that reference light with a wavelength $\lambda$ changed from 310 nm to 420 nm with a step of 2 nm is incident on the spectrum detector 2000 under the condition of an incident angle $\theta$ of 19° and an incident angle $\Phi$ ranging from 0° to 360° (preferably, $\Phi$ ranging from 0° to 90°. In addition, the setting of the range of the wavelength of the reference light or the width of the step is not limited thereto, and may be appropriately modified corresponding to a peak wavelength that can be detected by the photodetectors 2001 to 2006. That is, the range of the wavelength of the reference light may be set to, for example, the range of visible light with a wavelength of 430 nm or more, the range of infrared light or the range of ultraviolet light, corresponding to the setting of the peak wavelength of light transmitted to the photodetectors 2001 to 2006.

When the reference light is incident on the spectrum detector 2000 under the aforementioned condition, potential differences (optical voltages) respectively outputted from the photodetectors 2001 to 2006 are measured by the optical voltage measurement circuit 2012A. In this case, whenever the reference light with a wavelength $\lambda$ changed from 310 nm to 420 nm with a step of 2 nm is incident at the angle $\Phi$, the potential differences (optical voltages) respectively outputted from the photodetectors 2001 to 2006 are measured by the optical voltage measurement circuit 2012A. Each of the potential differences (optical voltages) is measured as a voltage waveform changed as shown in FIG. 6.

In addition, although the incident angle $\Phi$ is preferably set to 0° to 90°, the setting of the incident angle $\Phi$ is based on when the incident angles $\Phi$ indicating minimum and maximum values of the optical voltage ($\mu$V) in FIG. 6 are 40° and 80°, respectively.

Next, voltage waveforms respectively measured from the photodetectors 2001 to 2006 for each reference light in the optical voltage measurement circuit 2012A are recorded as reference optical voltage measurement results in the memory 2012C by the control circuit 2012B. As described above, the measurement/record processing of the reference optical voltage is finished.

Figure 15:
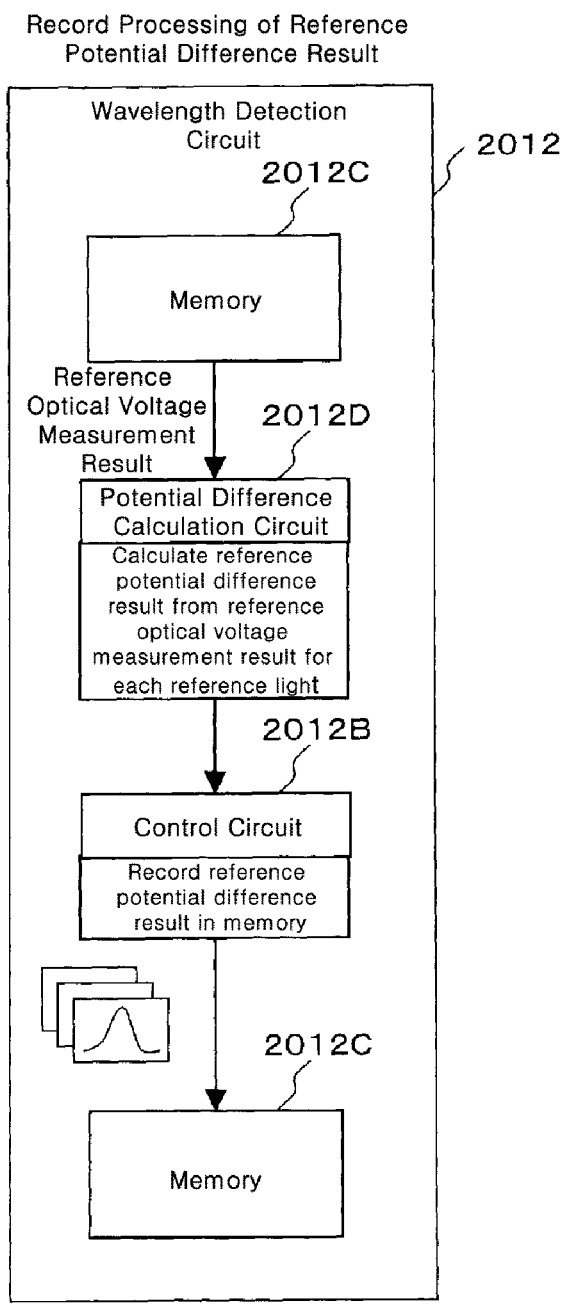
FIG. 15 is a view illustrating a record processing of a reference potential difference result, which is performed in the wavelength detection circuit 2012 of FIG. 13.

Thereafter, the record processing of the reference potential difference result, which is performed in the wavelength detection circuit 2012, will be described with reference to FIG. 15. This processing is performed when reference light is incident on the spectrum detector 2000. In addition, the configuration and processing procedure related to this processing are shown in the wavelength detection circuit 2012 shown in FIG. 15.

First, the potential difference calculation circuit 2012D sequentially reads the reference optical voltage measurement results recorded in the memory 2012C in the measurement/record processing of the reference optical voltage, inspects wavelength distributions of the corresponding optical voltages by spectrum-analyzing data of the minimum and maximum values (e.g., points designated by • in FIG. 6, the incident angle $\Phi$=40° and 80°) of the optical voltages, and then, calculates a difference (potential difference) between the wavelength distribution of the optical voltage (the incident angle $\Phi$=80°) with the maximum value and the wavelength distribution of the optical voltage (the incident angle $\Phi$=40°) with the minimum value. The calculating of the potential difference is repeatedly performed for each of the reference optical voltage measurement results recorded in the memory 2012C, thereby obtaining a voltage waveform with a peak wavelength as shown in FIG. 9 from each of the photodetectors 2001 to 2006, for each reference light with a wavelength $\lambda$ changed from 310 nm to 420 nm with a step of 2 nm.

Next, a voltage waveform showing a result calculated with respect to each of the photodetectors 2001 to 2006 for each reference light in the potential difference calculation circuit 2012D is recorded in the memory 2012C by the control circuit 2012B as a reference potential difference result for each of the photodetectors 2001 to 2006. As described above, the record processing of the reference potential difference result is finished.

Next, the wavelength detection processing performed in the wavelength detection circuit 2012 will be described with reference to FIGS. 16 and 17. This processing is performed when light to be measured is incident on the spectrum detector 2000. In addition, the configuration and processing procedure related to this processing are shown in the wavelength detection circuit 2012 shown in FIG. 16. Also, FIG. 17 is a flowchart illustrating details of the wavelength detection processing performed in the wavelength detection circuit 2012.

Figure 16:
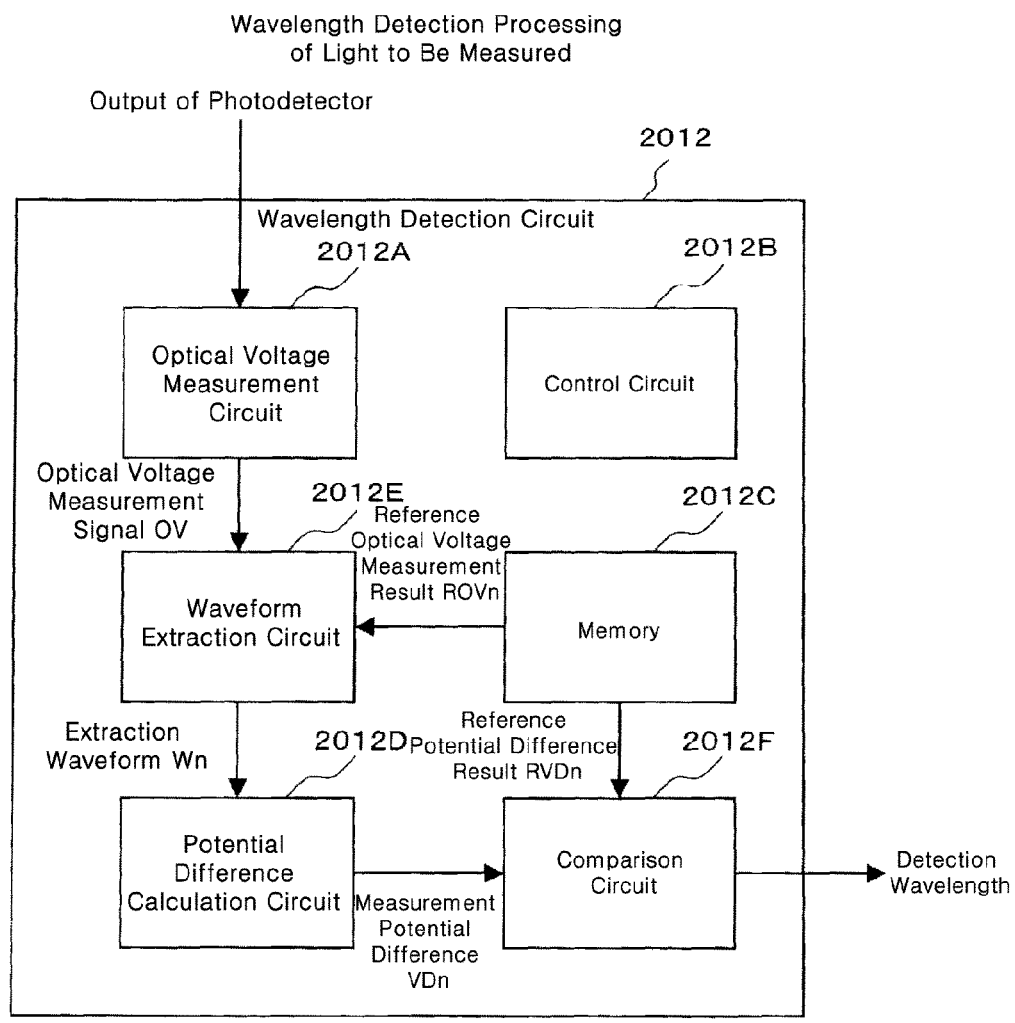
FIG. 16 is a view illustrating a wavelength detection processing which is performed in the wavelength detection circuit 2012 of FIG. 13.
Figure 17:
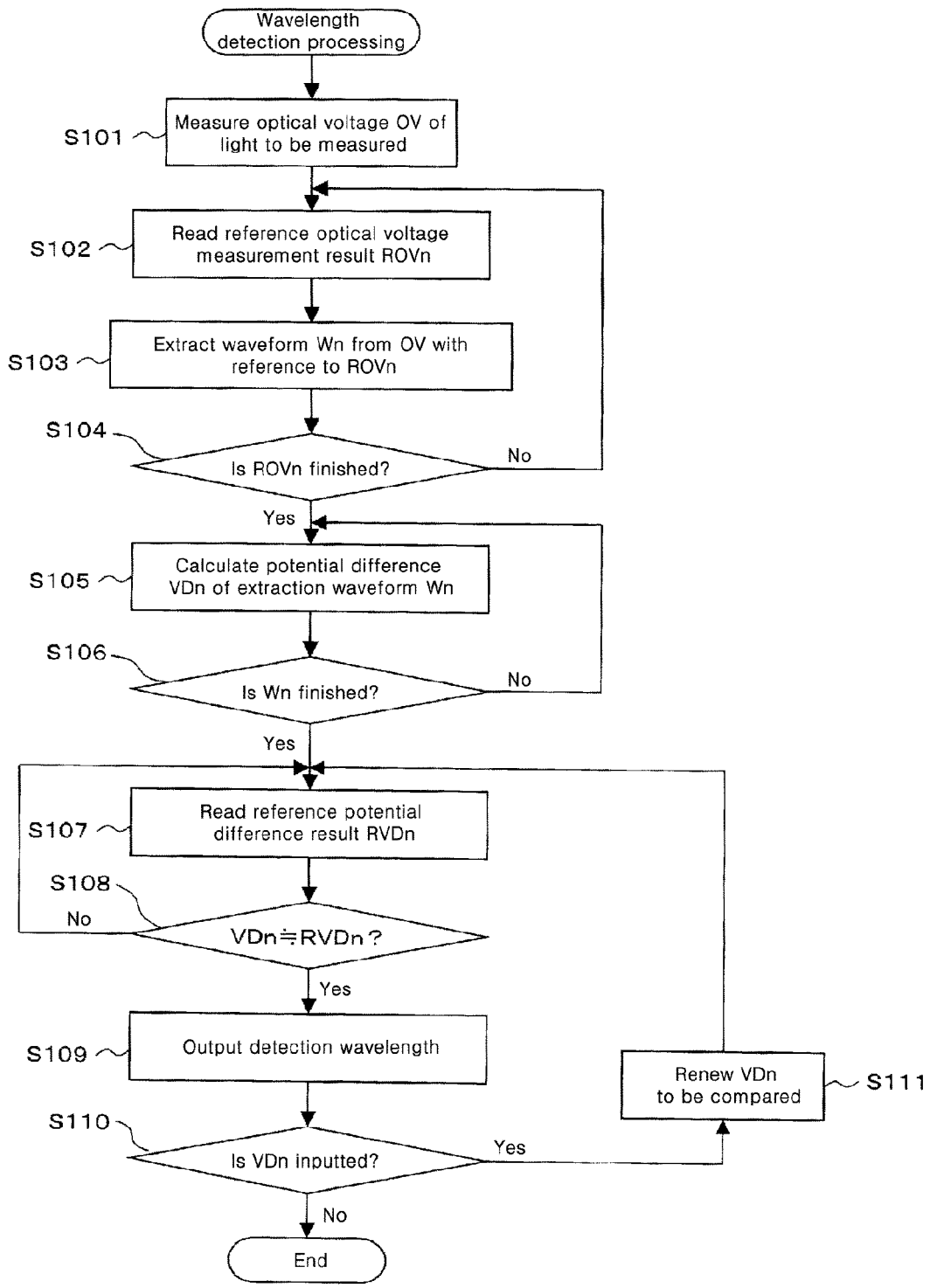
FIG. 17 is a flowchart illustrating the wavelength detection processing which is performed in the wavelength detection circuit 2012 of FIG. 13.

In the processing shown in FIGS. 16 and 17, it is assumed that light to be measured is incident on the spectrum detector 2000 under the condition of an incident angle $\theta$ of 19° and an incident angle $\Phi$ ranging from 0° to 360° (preferably, $\Phi$ ranging from 0° to 90°). In addition, the setting of the incident condition of the reference light is not limited thereto. Also, the flowchart shown in FIG. 17 is performed whenever the light to be measured is incident on the spectrum detector under an incident condition. Further, in FIG. 17, 'OV' denotes an optical voltage measurement signal in the optical voltage measurement circuit 2012A, and 'ROVn (n is an integer)' denotes one of a plurality of reference optical voltage measurement results recorded in the memory 2012C. Also, 'Wn (n is an integer)' denotes one of waveforms extracted from the optical voltage measurement signal OV in the waveform extraction circuit 2012E, 'VDn' denotes one of potential differences calculated from the extraction waveform Wn in the potential difference calculation circuit 2012D, and 'RVDn' denotes one of a plurality of reference potential difference results recorded in the memory 2012C.

When the light to be measured is incident on the spectrum detector 2000 under the aforementioned incident condition, potential differences (hereinafter, referred to as optical voltages) respectively outputted from the photodetectors 2001 to 2006 are measured in the optical voltage measurement circuit 2012A (Step S101). Each of the optical voltages is measured as a voltage waveform changed as shown in FIG. 6. The optical voltage measurement circuit 2012A outputs an optical voltage signal OV corresponding to each of the voltage waveforms to the waveform extraction circuit 2012E (see FIG. 16).

Next, the waveform extraction circuit 2012E reads a reference optical voltage measurement result ROVn from the memory 2012C (Step S102), and extracts a waveform to be a comparison object from the optical voltage measurement signal OV inputted from the optical voltage measurement circuit 2012A with reference to the reference optical voltage measurement result (Step S103). Since the wavelength component included in the light to be measured is unknown, the waveform of the optical voltage measurement signal OV is obtained by synthesizing a plurality of wavelength components. For this reason, the waveform extraction circuit 2012E extracts a waveform considered to include a peak wavelength λ from the optical voltage measurement signal OV, with reference to the reference optical voltage measurement result ROVn. The waveform extraction circuit 2012E outputs the extracted waveform as an extraction waveform Wn to the potential difference calculation circuit 2012D (see FIG. 16). The extraction wavelengths Wn are sequentially outputted by repeatedly performing the processing of Steps S102 and S103 as many as the number of the reference optical voltage measurement results ROVn recorded in the memory 2012C (Step S104).

Then, the potential difference calculation circuit 2012D calculates a measurement potential difference VDn of the extraction wavelength Wn using the calculating method described in the record processing of the reference potential voltage result (Step S105), and outputs the measurement potential difference VDn to the comparison circuit 2012F (see FIG. 16). The measurement potential differences VDn are sequentially calculated by repeatedly performing the processing of Step S105 as many as the number of the extraction waveforms (Step S106).

Next, the comparison circuit 2012F reads a reference potential difference result RVDn from the memory 2012C (Step S107), and compares the reference potential difference result RVDn with the measurement potential difference VDn inputted from the potential difference calculation circuit 2012D, to decide the presence of identity based on a correspondence rate (Step S108). The 'correspondence rate' may be decided, for example, based on an error rate obtained from the voltage difference between the reference potential difference result RVDn and the measurement potential difference VDn.

When it is decided that the correspondence rate between the reference potential difference result RVDn and the measurement potential difference VDn is small (the error rate is large) (Step S108: No), the comparison circuit 2012F returns to Step S107, and then, reads a next reference potential difference result RVDn and repeatedly performs the same decision processing. Also, when it is decided that the correspondence rate between the reference potential difference result RVDn and the measurement potential difference VDn is large (the error rate is small) (Step S108: Yes), the comparison circuit 2012F outputs the peak wavelength λ indicated by the corresponding reference potential difference result RVDn as a detection wavelength λ (Step S109) (see FIG. 16).

Next, the comparison circuit 2012F identifies the presence of input of the measurement potential difference VDn from the potential difference calculation circuit 2012D (Step S110). Then, when a next measurement potential difference VDn is inputted (Step S110: Yes), the comparison circuit 2012F sets another measurement potential voltage difference VDn as a comparison object (Step S111) and returns to Step S107. Also, when the measurement potential difference VDn is not inputted from the potential difference calculation circuit 2012D (Step S110: No), the comparison circuit 2012F finishes this processing.

As described above, the wavelength extraction processing is performed, so that it is possible to implement a high-precision spectrum detector capable of automatically extracting a plurality of peak wavelengths λ included in light to be measured based on each detection wavelength of the photodetectors 2001 to 2006. Thus, in the spectrum detector 2000 according to this embodiment, the spectrum distribution of light to be measured can be easily detected.

Further, according to the spectrum detector 2000 of this embodiment, it is possible to provide a small-sized spectrum detector that can be easily used and do not require a complicated alignment of an optical axis. Furthermore, since the spectrum detector 2000 according to this embodiment has a structure in which the spectrum detection function of light, which is performed by a light detection layer, and a light emission function, which is performed by a light emission layer, are combined by forming an LED layer (light emission layer) in a lower layer of the photodetectors 2001 to 2006, the spectrum detector can also be used as a light emitting device.

The invention claimed is:

1. A method of detecting a spectrum of light, the method comprising:
    absorbing light incident on a plurality of photodetectors arranged on a substrate, wherein each photodetector comprises a semiconductor having a plurality of convex portions, the convex portions being different from one another with respect to at least one of size, pitch, and height, and
    detecting a wavelength of light transmitted through the plurality of convex portions of each photodetector using a wavelength detection circuit,
    wherein detecting the wavelength of light comprises:
        measuring the optical voltages respectively outputted from the plurality of photodetectors using an optical voltage measurement circuit and outputting an optical voltage measurement signal;
        recording a plurality of reference optical voltage measurement results and a plurality of reference potential difference results respectively corresponding to the plurality of photodetectors using a memory;
        extracting a waveform of a comparison object from the optical voltage measurement signal and a reference optical voltage measurement signal using a waveform extraction circuit;
        calculating a potential difference of the waveform using a potential difference calculation circuit and outputting a measurement potential difference; and
        comparing the measurement potential difference with the plurality of reference potential difference results using a comparison circuit and detecting a peak wavelength included in the incident light.

2. The method of claim 1, further comprising outputting an optical voltage from the plurality of photodetectors in response to light incident thereon.

3. The method of claim 1, wherein the optical voltage measurement circuit measures an optical voltage outputted from each of the photodetectors when reference light including a known peak wavelength is incident on the plurality of photodetectors, and outputs a reference optical voltage measurement signal, and wherein the wavelength detection circuit comprises a control circuit recording the plurality of reference optical voltage measurement signals outputted from the optical voltage measurement circuit as the reference optical voltage measurement results in the memory.

4. The method of claim 1, wherein the potential difference calculation circuit calculates voltage differences of the plurality of reference optical voltage measurement results recorded in the memory and outputs the voltage differences as the reference potential difference results, and the control circuit records the plurality of reference potential difference results outputted from the potential difference calculation circuit in the memory.

5. The method of claim 1, wherein the plurality of photodetectors and the wavelength detection circuit are mounted on the same circuit board.

\* \* \* \* \*